United States Patent
Furukawa et al.

(10) Patent No.: US 9,484,126 B2
(45) Date of Patent: *Nov. 1, 2016

(54) COVERING MATERIAL FOR ELECTRIC WIRE, INSULATED ELECTRIC WIRE, AND WIRING HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Toyoki Furukawa, Yokkaichi (JP); Masashi Sato, Yokkaichi (JP); Masahiro Nakamura, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 103 days.

This patent is subject to a terminal disclaimer.

(21) Appl. No.: 14/075,537

(22) Filed: Nov. 8, 2013

(65) Prior Publication Data
US 2014/0060925 A1    Mar. 6, 2014

Related U.S. Application Data

(63) Continuation of application No. PCT/JP2012/063932, filed on May 30, 2012.

(30) Foreign Application Priority Data
Jun. 2, 2011  (JP) ................. 2011-124329

(51) Int. Cl.
*H01B 3/00* (2006.01)
*H01B 7/04* (2006.01)
(Continued)

(52) U.S. Cl.
CPC ................ *H01B 7/04* (2013.01); *H01B 3/443* (2013.01); *C08K 5/0016* (2013.01); *C08K 5/12* (2013.01);
(Continued)

(58) Field of Classification Search
USPC ....... 174/36, 110 R–110 PM, 120 R, 120 SR
See application file for complete search history.

(56) References Cited

U.S. PATENT DOCUMENTS 4,131,636 A * 12/1978 Matsumoto ........... C08F 259/04
                                                524/212
5,013,782 A *  5/1991 Tateno ..................... C08K 3/22
                                                524/417
(Continued)

FOREIGN PATENT DOCUMENTS

CN    1045404 A    9/1990
CN    1927934 A    3/2007
(Continued)

OTHER PUBLICATIONS

May 22, 2015 Office Action issued in Chinese Application No. 201280027118.2.
(Continued)

*Primary Examiner* — William H Mayo, III
(74) *Attorney, Agent, or Firm* — Oliff PLC

(57) ABSTRACT

A covering material for electric wire, and an insulated electric wire and a wiring harness including the same, wherein the wire including the covering material has a reduced diameter, is inserted into a connector. The covering material containing a polyvinyl chloride having, with respect to 100 parts by mass of the polyvinyl chloride, 10 to 20 parts by mass of a plasticizer, 1 to 6 parts by mass of a chlorinated polyethylene, and 1 to 6 parts by mass of an MBS resin, and a total amount of the chlorinated polyethylene and the MBS resin is 2 to 7 parts by mass. The wire has an external diameter of smaller than 1.1 mm, and has a conductor 1 and an insulator 2 that covers the conductor 1. The insulator 2 is made of the covering material, and has a thickness of 0.25 mm or smaller.

7 Claims, 1 Drawing Sheet

(51) Int. Cl.
*H01B 3/44* (2006.01)
*C08K 5/12* (2006.01)
*C08L 23/28* (2006.01)
*C08L 51/04* (2006.01)
*C08K 5/00* (2006.01)

(52) U.S. Cl.
CPC .............. *C08L 23/28* (2013.01); *C08L 23/286* (2013.01); *C08L 51/04* (2013.01); *C08L 2203/202* (2013.01); *C08L 2205/03* (2013.01); *Y10T 428/294* (2015.01)

(56) References Cited

U.S. PATENT DOCUMENTS

| | | | |
|---|---|---|---|
| 5,036,121 A | | 7/1991 | Coaker et al. |
| 5,736,605 A | * | 4/1998 | Oshima ................... C08L 27/06 524/521 |
| 8,754,157 B2 | * | 6/2014 | Furukawa .............. H01B 3/443 524/295 |
| 8,952,683 B2 | * | 2/2015 | Granig ................... G01D 5/145 324/207.21 |
| 2001/0004658 A1 | * | 6/2001 | Stieneker et al. ............ 525/308 |
| 2003/0050402 A1 | * | 3/2003 | Marchand et al. ........... 525/192 |
| 2003/0144423 A1 | * | 7/2003 | Marchand et al. ........... 525/239 |
| 2008/0234418 A1 | * | 9/2008 | Shoemaker .............. C08K 5/12 524/296 |
| 2010/0016509 A1 | * | 1/2010 | Fujita et al. .................. 525/207 |
| 2010/0252322 A1 | | 10/2010 | Sato et al. |
| 2010/0267872 A1 | * | 10/2010 | Lundquist et al. ........... 524/180 |
| 2012/0172511 A1 | | 7/2012 | Furukawa et al. |

FOREIGN PATENT DOCUMENTS

| | | | | |
|---|---|---|---|---|
| CN | 102575077 A | | 7/2012 | |
| JP | A-4-206312 | | 7/1992 | |
| JP | 06-223630 A | * | 1/1993 | ............... H01B 3/44 |
| JP | A-6-223630 | | 8/1994 | |
| JP | 07-188488 A | * | 7/1995 | .............. C08L 27/06 |
| JP | A-7-188488 | | 7/1995 | |
| JP | A-9-77939 | | 3/1997 | |
| JP | A-2000-260228 | | 9/2000 | |
| JP | 2001-335668 A | * | 12/2001 | .............. C08L 27/06 |
| JP | A-2009-181850 | | 8/2009 | |
| JP | A-2011-126980 | | 6/2011 | |
| WO | WO 2011/152295 A1 | | 12/2011 | |

OTHER PUBLICATIONS

International Search Report issued in International Patent Application No. PCT/JP2012/063932 dated Jul. 24, 2012.
Jan. 13, 2016 Office Action issued in Chinese Patent Application No. 201280027118.2.
Jul. 8, 2016 Office Action issued in Chinese Patent Application No. 2012-80027118.2.

* cited by examiner

COVERING MATERIAL FOR ELECTRIC WIRE, INSULATED ELECTRIC WIRE, AND WIRING HARNESS

This is a Continuation of Application No. PCT/JP2012/063932 filed May 30, 2012, which claims the benefit of Japanese Application No. 2011-124329 filed Jun. 2, 2011. The disclosure of the prior applications are hereby incorporated by reference herein in their entirety.

TECHNICAL FIELD

The present invention relates to a covering material for electric wire, an insulated electric wire, and a wiring harness, and more specifically relates to a covering material suitably used as a covering material of an insulated electric wire that is used for wiring in an automobile or other devices, and an insulated electric wire and a wiring harness including the same.

BACKGROUND ART

Conventionally, a polyvinyl chloride resin composition is generally used as an insulator of a low-voltage electric wire for an automobile since the resin is excellent in flame retardancy and chemical resistance. Recently, demand for thinning of an insulator of an electric wire and reduction of a diameter of the wire is rising increasingly to meet a requirement of using a limited space in an automobile effectively.

An electric wire having a reduced diameter has a problem that when a terminal of the wire is inserted into a connector, the insertion is made difficult by buckling of the wire. To solve the problem, the present applicants previously proposed an insulated electric wire including an insulating material having a flexural modulus of larger than 2.0 GPa (see PTL 1).

CITATION LIST

Patent Literature

PTL1: JP 2009-181850 A

SUMMARY OF INVENTION

Technical Problem

Since the insulated electric wire disclosed in PTL 1 includes the insulating material having the flexural modulus of larger than 2.0 GPa, the terminal of the wire is inserted into a connector easily without buckling of the wire even if the wire is a thin-walled electric wire having a insulator thickness of 0.25 mm or smaller. Further, PTL 1 states that the insulated electric wire disclosed has sufficient flexibility required for an electric wire for an automobile since the insulating material has a breaking elongation of 10% or larger.

However, the insulating materials having flexural moduli of larger than 2.0 GPa disclosed in PTL 1 are so expensive that production cost of the insulated electric wire is increased.

The present inventors tried to make an insulated electric wire including an insulating material that mainly consists of a polyvinyl chloride, which is inexpensive. However, when the amount of a plasticizer contained in the insulating material is reduced to increase a flexural modulus of the material, sufficient flexibility was not obtained while insertion of the terminal of the wire into a connector became easy.

Further, the insulating material that contains the polyvinyl chloride as the main component and the reduced amount of the plasticizer tends to have poor extrusion processibility on forming an insulating electric wire by covering an electric wire with the material. The appearance of the insulated electric wire thus tends to be inferior.

An object of the present invention is to overcome the problems described above and to provide a covering material for electric wire mainly consisting of a polyvinyl chloride, and an insulated electric wire and a wiring harness including the same, wherein the wire including the covering material has a reduced diameter, is inserted into a connector without buckling while having sufficient flexibility, and has good appearance.

Solution to Problem

To achieve the objects and in accordance with the purpose of the present invention, a covering material for electric wire containing a polyvinyl chloride according to a preferred embodiment of the present invention contains, with respect to 100 parts by mass of the polyvinyl chloride, 10 to 20 parts by mass of a plasticizer, 1 to 6 parts by mass of a chlorinated polyethylene, and 1 to 6 parts by mass of an MBS resin, and a total amount of the chlorinated polyethylene and the MBS resin is 2 to 7 parts by mass.

In the covering material, the plasticizer preferably contains one or more selected from a phthalate ester plasticizer, a trimellitate ester plasticizer, a pyromellitate ester plasticizer, and an aliphatic ester plasticizer.

In another aspect of the present invention, an insulated electric wire having an external diameter of smaller than 1.1 mm according to a preferred embodiment of the present invention includes a conductor and an insulator that covers the conductor, the insulator having a thickness of 0.25 mm or smaller, and being made of the covering material described above.

Yet, in another aspect of the present invention, a wiring harness according to a preferred embodiment of the present invention includes the insulated electric wire described above.

Advantageous Effects of Invention

Since the covering material for electric wire according the preferred embodiment of the present invention contains the specific amounts of the plasticizer, the chlorinated polyethylene, and the MBS resin as well as the polyvinyl chloride, an insulated electric wire including the covering material as an insulator is successfully inserted into a connector without buckling while having sufficient flexibility, even if the wire has an insulator thickness of 0.25 mm or smaller and an external diameter of smaller than 1.1 mm. Further, the wire has an excellent appearance. The wire having the reduced diameter and the wiring harness including the wire contribute to weight reduction and space saving of automobiles or other devices in which the wire and the wiring harness are used.

DESCRIPTION OF EMBODIMENTS

Figure 1A:
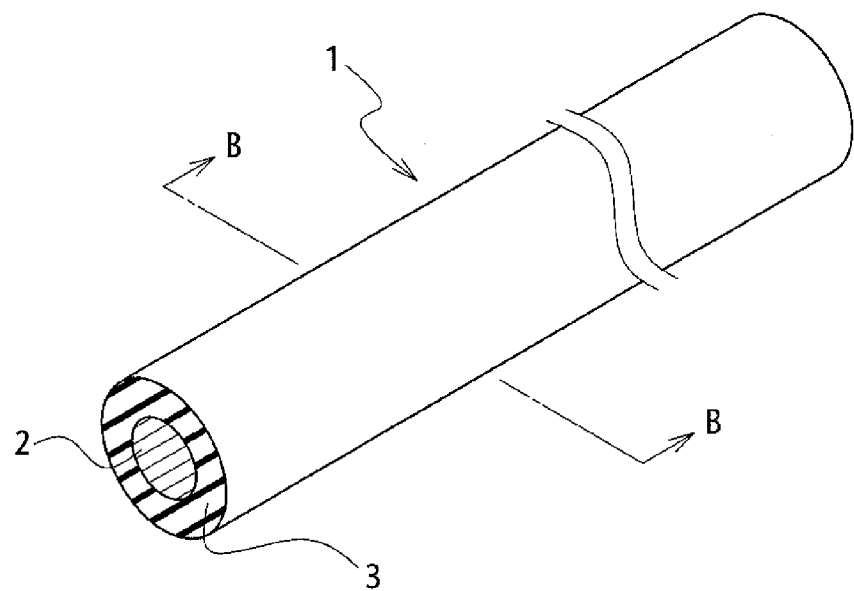
FIG. 1A is an external perspective view showing an insulated electric wire according to a preferred embodiment of the present invention.
Figure 1B:
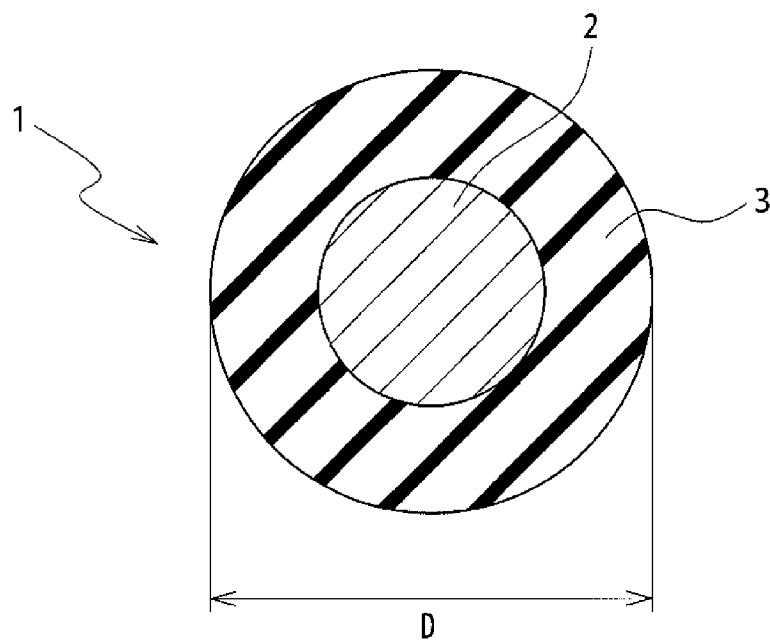
FIG. 1B is a cross-sectional view showing the same along the line B-B in FIG. 1A.

A detailed description of a preferred embodiment of the present invention will now be provided with reference to the accompanying drawings. FIG. 1A is an external perspective view showing an insulated electric wire according to the preferred embodiment of the present invention. FIG. 1B is a cross-sectional view showing the same along the line B-B in FIG. 1A. As shown in FIGS. 1A and 1B, an insulated electric wire 1 according to the preferred embodiment of the present invention has a configuration such that an insulator 3 covers a conductor 2, and the insulated electric wire 1 has an external diameter (D) of smaller than 1.1 mm.

The conductor 2 is preferably made of copper, aluminum, a copper alloy, an aluminum alloy, or a stainless steel. The conductor 2 is preferably a single elemental wire, a strand of a plurality of elemental wires, or a compressed strand. If the conductor 2 is a strand of a plurality of elemental wires, elemental wires that are including two or more different kinds of materials may be used in combination. The conductor 2 preferably has a cross-sectional area of 0.13 $mm^2$.

The insulator 3 is made of a covering material for electric wire that mainly contains a polyvinyl chloride as a base resin and further contains a plasticizer, a chlorinated polyethylene, and an MBS resin, at least.

The insulator 3 has a standard thickness of 0.25 mm or smaller. If the thickness is larger than 0.25 mm, the insulator 3 is not sufficiently thin. In addition, because the external diameter of the insulated electric wire 1 is smaller than 1.1 mm, if the thickness is larger than 0.25 mm, the conductor 2 is too thin in comparison with the insulator to have sufficient conductivity. On the other hand, the thickness of the insulator 3 is preferably 0.1 mm or larger. This is because if the thickness is smaller than 0.1 mm, it is difficult to form a uniform coating of the insulator 3, and the insulator 3 might not deliver sufficient insulation performance.

The amounts of the plasticizer, the chlorinated polyethylene, and the MBS resin contained in the insulator 3 are within specific ranges. Further, the total amount of the chlorinated polyethylene and the MBS resin is within a specific range.

A polymerization degree of the polyvinyl chloride as the base resin, which is not limited specifically, is preferably 800 or higher in view of suppressing decrease in improvement effect on a buckling resistance force of the wire brought by reduction of the amount of the plasticizer. On the other hand, the polymerization degree is preferably 2800 or lower in view of suppressing decrease in mixing property of the polyvinyl chloride with the other components. The polymerization degree is preferably within a range of 1300 to 2500.

The content of the plasticizer is within a range of 10 to 20 parts by mass with respect to 100 parts by mass of the polyvinyl chloride. This is because if the content is less than 10 parts by mass, extrusion processability of the electric wire could be too low to deliver a good appearance to the wire, and the wire could not have sufficient flexibility. On the other hand, if the content is more than 20 parts by mass, the electric wire could not have a sufficiently large buckling resistance force, and thus a failure might occur on insertion of the terminal of the wire into a connector.

The plasticizer includes one or more selected from a phthalate ester plasticizer, a trimellitate ester plasticizer, a pyromellitate ester plasticizer, and an aliphatic ester plasticizer. These plasticizers deliver excellent plasticizing effects.

Examples of an alcohol composing the phthalate ester plasticizer include a saturated aliphatic alcohol having a carbon number of 8 to 13. They may be used singly or in combination. More specifically, examples of the phthalate plasticizer include di-2-ethylhexyl phthalate, di-n-oxtyl phthalate, diisononyl phthalate, dinonyl phthalate, dilsodecyl phthalate, and ditridecyl phthalate.

Examples of an alcohol composing the trimellitate and the pyromellitate ester plasticizers include a saturated aliphatic alcohol having a carbon number of 8 to 13. They may be used singly or in combination.

Examples of the aliphatic ester plasticizer include an adipate ester, a sebacate ester, and an azelate ester. Examples of an alcohol composing the ester include a saturated aliphatic alcohol having a carbon number of 3 to 13. They may be used singly or in combination. More specifically, examples of the aliphatic plasticizer include dioctyl adipate, isononyl adipate, dibutyl sebacate, dioctyl sebacate, and dioctyl azelate.

The chlorinated polyethylene preferably contains 15 to 45 mass % of chlorine. Examples of the chlorinated polyethylene include a noncrystalline chlorinated polyethylene and a semicrystalline chlorinated polyethylene. They may be used singly or in combination.

The content of the chlorinated polyethylene is within a range of 1 to 6 parts by mass with respect to 100 parts by mass of the polyvinyl chloride. This is because if the content is less than 1 part by mass, the extrusion processability of the wire could be low, and thus an appearance of the wire could be inferior. On the other hand, if the content is more than 6 parts by mass, the buckling resistance force of the wire could be small, and thus a failure might occur on insertion of the terminal of the wire into a connector.

The content of the chlorinated polyethylene with respect to 100 parts by mass of the polyvinyl chloride is preferably within a range of 2 to 5 parts by mass, and more preferably within a range of 3 to 4 parts by mass.

Preferable examples of the MBS resin include a polymer obtained via graft copolymerization of a monomer such as an acrylic monomer such as methyl acrylate and ethyl acrylate, and a styrene monomer to a rubber component such as a polybutadiene and a styrene-butadiene copolymer. The content of the rubber component in the polymer is within a range of 20 to 75 mass %.

The content of the MBS resin is within a range of 1 to 6 parts by mass with respect to 100 parts by mass of the polyvinyl chloride. This is because if the content is less than 1 part by mass, the insulated electric wire could not have sufficient flexibility. On the other hand, if the content is more than 6 parts by mass, the buckling resistance force of the electric wire could be small, and thus a failure might occur on insertion of the terminal of the wire into a connector. The content of the MBS resin with respect to 100 parts by mass of the polyvinyl chloride is preferably within a range of 2 to 5 parts by mass, and more preferably within a range of 3 to 4 parts by mass.

The covering material for electric wire according to the preferred embodiment of the present invention is a polyvinyl chloride-based composition that contains both the chlorinated polyethylene and the MBS resin. A polyvinyl chloride-based composition that contains either the chlorinated polyethylene or the MBS resin singly could not have a sufficiently large buckling resistance force, sufficient flexibility, and good appearance of the insulator, all simultaneously. The total content of the chlorinated polyethylene and the MBS resin in the covering material is within a range of 2 to 7 parts by mass with respect to 100 parts by mass of the polyvinyl chloride. This is because if the total content is less than 2 parts by mass, the electric wire could not have at least one of sufficient flexibility and good appearance of the insulator. On the other hand, if the total content is more than 7 parts by mass, the buckling resistance force could be small, and thus a failure might occur on insertion of the terminal of the wire into a connector.

The total content of the chlorinated polyethylene and the MBS resin with respect to 100 parts by mass of the polyvinyl chloride is preferably within a range of 3 to 6 parts by mass, and more preferably within a range of 4 to 5 parts by mass.

The covering material for electric wire according to the preferred embodiment of the present invention may further contain an ingredient other than the polyvinyl chloride, the plasticizer, the chlorinated polyethylene, and the MBS resin within a range of not impairing the object of the preferred embodiment of the present invention. Examples of the ingredient other than the essential components include additives that are generally mixed in a covering material for electric wire such as a stabilizer, a pigment, an antioxidant, and a bulking filler.

The covering material according to the preferred embodiment of the present invention can be prepared in a form of a polyvinyl chloride composition by mixing the plasticizer, the chlorinated polyethylene, the MBS resin, and the additives as necessary into the polyvinyl chloride as the base resin, and by heat-kneading the mixture. A generally used kneader such as a Banbury mixer, a pressure kneader, a kneading extruder, a twin screw extruder and a roll can be used for the kneading. It is preferable that the components are dry blended by using a tumbler before the kneading. After the kneading, the composition is taken out of the kneader. The composition is preferably pelletized using a pelletizing machine. Next, an insulated electric wire 1 according to the preferred embodiment of the present invention including the covering material 3 as an insulator can be prepared by extrusion-covering a conductor 2 with the prepared covering material.

The insulated electric wire according to the preferred embodiment of the present invention has the form of a single wire as shown in FIGS. 1A and 1B; however, the present invention is not limited thereto, and the insulated electric wire may have the form of a flat wire or a shielded wire (not shown). In addition, in preparation of a wiring harness including the insulated electric wire according to the preferred embodiment of the present invention, the form of the wiring harness can be varied according to the form of the insulated electric wire.

The insulated electric wire according to the preferred embodiment of the present invention can be used for an automobile, a device, information and telecommunications, electric power supply, a ship, or an aircraft, while most favorably used for an automobile.

EXAMPLE

A description of the present invention will now be specifically provided with reference to examples and comparative examples; however, the present invention is not limited to the examples.

Examples 1-25 and Comparative Examples 1-14

(Preparation of Covering Materials for Electric Wire)

Polyvinyl chloride compositions according to Examples and Comparative Examples were prepared by mixing polyvinyl chloride, plasticizer (component A), chlorinated polyethylene (component B) MBS resin (component C), and lead-free stabilizer at a temperature of 180° C. with a single screw kneader, and pelletizing the mixture with a pelletizing machine. The amounts of the components are shown in Tables 1-3 in parts by mass.

(Preparation of Insulated Electric Wires)

Insulated electric wires having an external diameter D of 0.85 mm were prepared by extrusion-molding the prepared polyvinyl chloride compositions onto stranded conductors having a cross-sectional area of 0.13 $mm^2$ to have a covering thickness of 0.2 mm. To evaluate properties of the obtained insulated electric wires, self-diameter winding, buckling resistance force, and appearance tests were carried out. Results of the tests are shown in Tables 1-3. Details of the materials used for preparation of the covering insulation materials listed in Tables 1-3 and details of the evaluation methods are described below.

(Details of Materials Used for Preparation of Covering Insulation Materials Listed in Tables 1-3)

Polyvinyl chloride (polymerization degree (PD): 800): manuf.: SHIN DAI-ICHI VINYL CORPORATION, trade name: "ZEST800Z"

Polyvinyl chloride (polymerization degree (PD): 1300): manuf.: SHIN DAI-ICHI VINYL CORPORATION, trade name: "ZEST1300Z"

Polyvinyl chloride (polymerization degree (PD): 2500): manuf.: SHIN DAI-ICHI VINYL CORPORATION, trade name: "ZEST2500Z"

Noncrystalline chlorinated polyethylene (CPE): manuf.: SHOWA DENKO K.K., trade name: "ELASLEN 401A"

Semicrystalline chlorinated polyethylene (CPE): manuf.: SHOWA DENKO K.K., trade name: "ELASLEN 404B"

MBS resin: manuf.: MITSUBISHI RAYON CO., LTD., trade name: "METABLEN C-323A"

Trimellitate ester: manuf.: DIC CORPORATION, trade name: "W-700"

Pyromellitate ester: manuf.: DIC CORPORATION, trade name: "W-7010"

Phthalate ester: manuf.: J-PLUS CO., LTD., trade name: "DUP"

Adipate eater: manuf.: DIC CORPORATION, trade name: "W-242"

Lead-free stabilizer: manuf.: ADEKA CORPORATION, trade name: "RUP-100"

(Procedures of Evaluation)

<Self-Diameter Winding Test>

A self-diameter winding test was carried out to evaluate the flexibility of each insulated electric wire. The insulated electric wires were each wound three times around a mandrel having a diameter same as the external diameter of the electric wires, and appearances of the wires were observed. Among the observed wires, the wires that did not have in their insulators a crack or a fracture through which the conductors inside could be exposed were subjected to a withstand voltage test in which a voltage of 1 kV was applied to the wound wires for 1 minute. The wires that did not have a crack or an exposed portion in their appearances and did not sustain damage in the withstand voltage test were evaluated as PASSED. The insulated electric wires that had a crack or an exposed portion in their appearances or sustained damage in the withstand voltage test were evaluated as FAILED.

<Measurement of Buckling Resistance Force>

The insulated electric wires were each held at positions 10 mm apart from their ends, and pressed in a vertical direction against a flat plate at a constant speed (200 mm/min) until the wires buckled. Loads that were applied to the insulated electric wires at the time when the insulated electric wires buckled were measured. The measured loads define buckling resistance forces (N) of the wires. The measurement of buckling resistance force is intended to evaluate the degrees of buckling of the insulated electric wires at the time when the terminals of the wires are inserted into a connector. A larger value of the buckling resistance force indicates lower possibility of buckling. Judging that the ends of insulated electric wires having a buckling resistance force of 10 N or larger could be inserted into a connector in a favorable manner in the actual insertion, the insulated electric wires having a buckling resistance force of 10 N or larger were evaluated as PASSED while the insulated electric wires having a buckling resistance force of smaller than 10 N were evaluated as FAILED.

<Appearance Test>

Appearances of the obtained insulated electric wires were evaluated by visual observation. The wires having highly smooth surfaces that are adequate for practical applications were evaluated as PASSED. The wires having rough structures such as frosty structures and pitted structures that are not adequate for practical applications were evaluated as FAILED.

TABLE 1

| | | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Composition of covering material | | | | | | | | | | | | | | |
| Polyvinyl chloride (PD = 800) | | | | | | | | | | | | | | 100 |
| Polyvinyl chloride (PD = 1300) | | 100 | 100 | 100 | 100 | 100 | 100 | 100 | 100 | 100 | 100 | 100 | 100 | |
| Polyvinyl chloride (PD = 2500) | | | | | | | | | | | | | | |
| B Noncrystalline CPE | | 4 | 1 | 3 | 4 | | 3 | 6 | 1 | 2 | 1 | 3 | | 2 |
| Semicrystalline CPE | | | | | | 2 | | | 1 | | 1 | 2 | 4 | |
| C MBS resin | | 2 | 1 | 4 | 2 | 2 | 4 | 1 | 2 | 3 | 1 | 2 | 3 | 5 |
| A Trimellitate ester | | 15 | 10 | 20 | | 15 | | | 15 | 5 | 10 | 5 | 5 | 10 |
| Pyromellitate ester | | | | | 15 | | | | | 5 | | 5 | | |
| Phthalate ester | | | | | | | 10 | | | | | 5 | 5 | |
| Adipate ester | | | | | | | | 20 | | | | 5 | 5 | |
| Lead-free stabilizer | | 5 | 5 | 5 | 5 | 5 | 5 | 5 | 5 | 5 | 5 | 5 | 5 | 3 |
| Content of component A | | 15 | 10 | 20 | 15 | 15 | 10 | 20 | 15 | 10 | 15 | 20 | 10 | 10 |
| Content of component B | | 4 | 1 | 3 | 4 | 2 | 3 | 6 | 2 | 2 | 2 | 5 | 4 | 2 |
| Total content of components B & C | | 6 | 2 | 7 | 6 | 4 | 7 | 7 | 4 | 5 | 3 | 7 | 7 | 7 |
| Results of evaluation | | | | | | | | | | | | | | |
| Self diameter winding | Evaluation | P | P | P | P | P | P | P | P | P | P | P | P | P |
| Buckling force | Value [N] | 11 | 13 | 10 | 11 | 11 | 11 | 10 | 11 | 13 | 11 | 10 | 11 | 11 |
| | Evaluation | P | P | P | P | P | P | P | P | P | P | P | P | P |
| Appearance | Evaluation | P | P | P | P | P | P | P | P | P | P | P | P | P |

P = PASSED;
F = FAILED

TABLE 2

| | | Examples | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| Composition of covering material | | | | | | | | | | | | | |
| Polyvinyl chloride (PD = 800) | | | | | | 100 | | 100 | | 100 | | | |
| Polyvinyl chloride (PD = 1300) | | 100 | | 100 | | | | | 100 | | 100 | | 100 |
| Polyvinyl chloride (PD = 2500) | | | 100 | | 100 | | 100 | | | | | 100 | |
| B Noncrystalline CPE | | 5 | | 2 | 1 | 4 | | 2 | 1 | | 1 | 4 | 1 |
| Semicrystalline CPE | | | 4 | 2 | | | 5 | 2 | 1 | 1 | 2 | 2 | |
| C MBS resin | | 1 | 2 | 2 | 1 | 2 | 1 | 1 | 1 | 1 | 2 | 1 | 6 |
| A Trimellitate ester | | 10 | 10 | | 5 | | 15 | | 20 | | | | 15 |
| Pyromellitate ester | | 5 | | 10 | 5 | | | 10 | | 15 | | 20 | |
| Phthalate ester | | | 5 | | | 10 | | 5 | | 5 | | | |
| Adipate ester | | | 5 | | | 10 | | 5 | | | 15 | | |
| Lead-free stabilizer | | 5 | 8 | 5 | 8 | 3 | 8 | 3 | 5 | 3 | 5 | 8 | 5 |
| Content of component A | | 15 | 20 | 10 | 10 | 20 | 15 | 20 | 20 | 20 | 15 | 20 | 15 |
| Content of component B | | 5 | 4 | 4 | 1 | 4 | 5 | 4 | 2 | 1 | 3 | 6 | 1 |
| Total content of components B & C | | 6 | 6 | 6 | 2 | 6 | 6 | 5 | 3 | 2 | 5 | 7 | 7 |
| Results of evaluation | | | | | | | | | | | | | |
| Self diameter winding | Evaluation | P | P | P | P | P | P | P | P | P | P | P | P |

TABLE 2-continued

| | | Examples | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| Buckling force | Value [N] | 11 | 10 | 12 | 13 | 10 | 11 | 10 | 10 | 11 | 11 | 10 | 11 |
| | Evaluation | P | P | P | P | P | P | P | P | P | P | P | P |
| Appearance | Evaluation | P | P | P | P | P | P | P | P | P | P | P | P |

P = PASSED;
F = FAILED

TABLE 3

| | | Comparative Examples | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Composition of covering material | | | | | | | | | | | | | | | |
| | Polyvinyl chloride (PD = 800) | | | | | | | | | 100 | 100 | | | | |
| | Polyvinyl chloride (PD = 1300) | 100 | 100 | 100 | 100 | 100 | 100 | 100 | 100 | | | | | 100 | 100 |
| | Polyvinyl chloride (PD = 2500) | | | | | | | | | | | 100 | 100 | | |
| B | Noncrystalline CPE | 3 | 4 | | 4 | 2 | 1 | 4 | 2 | | 2 | | | | 3 |
| | Semicrystalline CPE | | | | 4 | | | | 2 | | | | 4 | | 3 |
| C | MBS resin | 2 | 2 | 6 | 2 | | 7 | 4 | 4 | 2 | 6 | | 4 | 1 | 2 |
| A | Trimellitate ester | 25 | | 15 | | 15 | | | | 25 | | 5 | 5 | | 15 |
| | Pyromellitate ester | | 5 | | 15 | | 10 | 5 | | | | 5 | | | |
| | Phthalate ester | | | | | 5 | | 10 | | | 25 | | | 20 | |
| | Adipate ester | | | | | | | | 25 | | | | | | |
| | Lead-free stabilizer | 5 | 5 | 5 | 5 | 5 | 5 | 5 | 5 | 3 | 5 | 8 | 5 | 5 | 8 |
| Content of component A | | 25 | 5 | 15 | 15 | 20 | 10 | 15 | 25 | 25 | 25 | 10 | 5 | 20 | 15 |
| Content of component B | | 3 | 4 | 0 | 8 | 2 | 1 | 4 | 4 | 2 | 2 | 0 | 4 | 0 | 6 |
| Total content of components B & C | | 5 | 6 | 6 | 10 | 2 | 8 | 8 | 8 | 4 | 8 | 0 | 8 | 1 | 8 |
| Results of evaluation | | | | | | | | | | | | | | | |
| Self-diameter winding | Evaluation | P | F | P | P | F | P | P | P | P | P | F | F | P | P |
| Buckling force | Value [N] | 9 | 12 | 11 | 9 | 10 | 9 | 9 | 8 | 9 | 8 | 13 | 12 | 10 | 9 |
| | Evaluation | F | P | P | F | P | F | F | F | F | F | P | P | P | F |
| Appearance | Evaluation | P | F | F | P | P | P | P | P | F | P | F | P | F | P |

P = PASSED;
F = FAILED

As shown in Table 3, the insulating electric wires according to Comparative Examples 1 to 14 do not have the all required properties evaluated in the tests described above, since the insulating covering materials included in the wires do not include the all constituent features of the covering material for electric wire according to the preferred embodiment of the present invention. Meanwhile, as shown in Tables 1 and 2, the insulating electric wires according to Examples 1 to 25 have the all required properties evaluated in the self-diameter winding, buckling resistance force, and appearance tests, since the wires include the all constituent features of the covering material for electric wire according to preferred embodiment of the present invention.

The invention claimed is:

1. A covering material for electric wire containing a polyvinyl chloride, wherein
the covering material comprises, with respect to 100 parts by mass of the polyvinyl chloride:
 10 to 20 parts by mass of a plasticizer;
 1 to 6 parts by mass of a chlorinated polyethylene; and
 1 to 6 parts by mass of an MBS resin,
a total amount of the chlorinated polyethylene and the MBS resin is 2 to 7 parts by mass, and
a resin content of the covering material consists of the polyvinyl chloride, the MBS resin and the chlorinated polyethylene.

2. The covering material according to claim 1, wherein the plasticizer comprises one or more selected from a phthalate ester plasticizer, a trimellitate ester plasticizer, a pyromellitate ester plasticizer, and an aliphatic ester plasticizer.

3. An insulated electric wire having an external diameter of smaller than 1.1 mm, the wire comprising:
a conductor; and
an insulator that covers the conductor, the insulator having a thickness of 0.25 mm or smaller, and being made of the covering material according to claim 2.

4. A wiring harness comprising the insulated electric wire according to claim 3.

5. An insulated electric wire having an external diameter of smaller than 1.1 mm, the wire comprising:
a conductor; and
an insulator that covers the conductor, the insulator having a thickness of 0.25 mm or smaller, and being made of the covering material according to claim 1.

6. A wiring harness comprising the insulated electric wire according to claim 5.

7. The covering material according to claim 1, wherein the covering material comprises, with respect to 100 parts by mass of the polyvinyl chloride:
 2 to 5 parts by mass of a chlorinated polyethylene; and
 2 to 5 parts by mass of an MBS resin.

* * * * *